Sept. 14, 1948.  A. C. ERISMAN  2,449,462
DISPLAY DEVICE EMBODYING HINGED OR PIVOTED
MEMBERS SIMULATING BOOK LEAVES
Filed Feb. 16, 1945  3 Sheets-Sheet 1

Inventor
Adolph C. Erisman,

By M. C. Tyddaue

Attorney

Sept. 14, 1948.  A. C. ERISMAN  2,449,462
DISPLAY DEVICE EMBODYING HINGED OR PIVOTED
MEMBERS SIMULATING BOOK LEAVES
Filed Feb. 16, 1945  3 Sheets-Sheet 2

Inventor
Adolph C. Erisman,

By

Attorney

Sept. 14, 1948.    A. C. ERISMAN    2,449,462
DISPLAY DEVICE EMBODYING HINGED OR PIVOTED
MEMBERS SIMULATING BOOK LEAVES
Filed Feb. 16, 1945    3 Sheets-Sheet 3
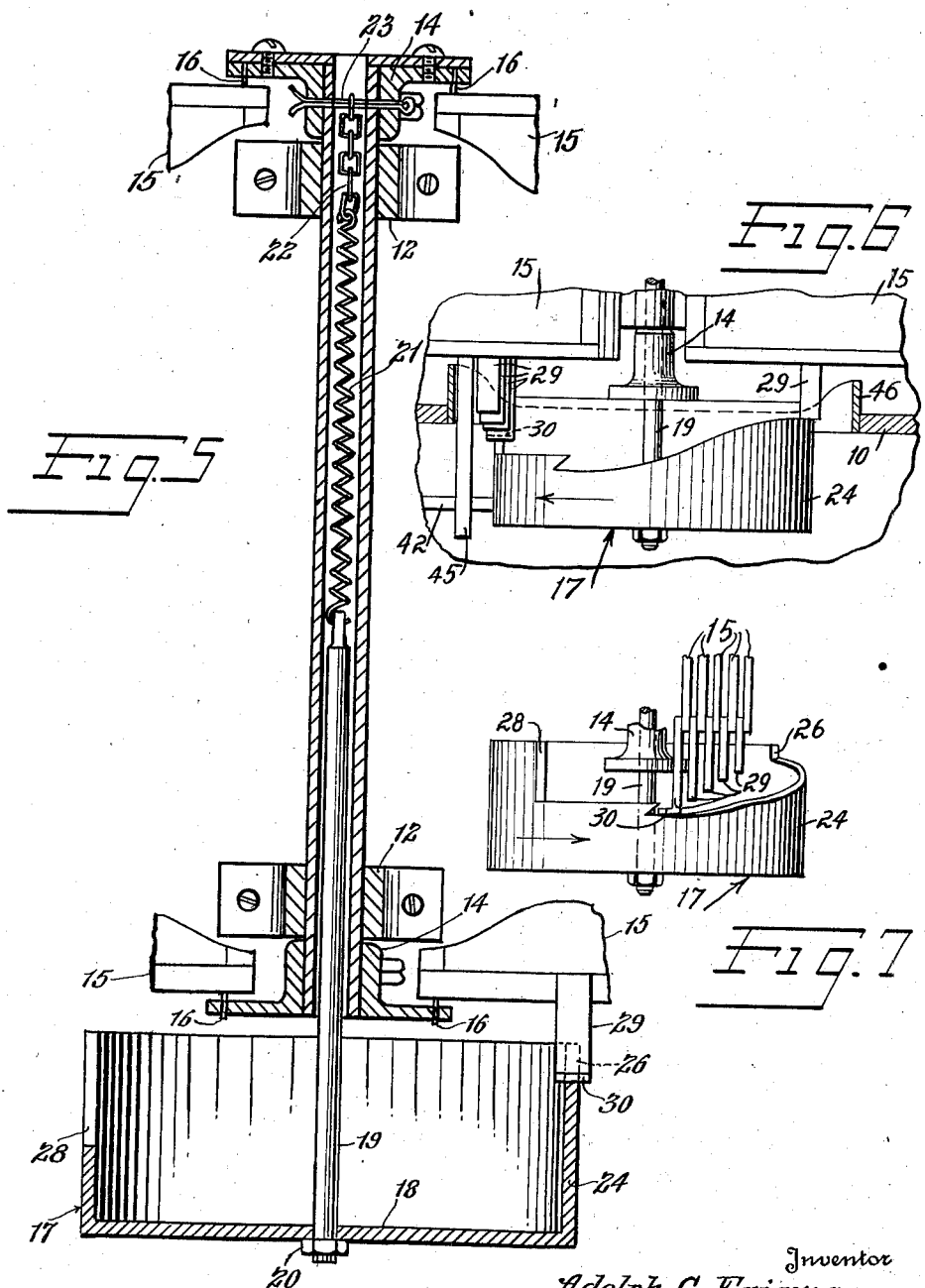
Inventor
Adolph C. Erisman,
By M. C. Lyddane
Attorney Patented Sept. 14, 1948

2,449,462

UNITED STATES PATENT OFFICE 2,449,462

DISPLAY DEVICE EMBODYING HINGED OR PIVOTED MEMBERS SIMULATING BOOK LEAVES

Adolph C. Erisman, Port Richmond, N. Y., assignor to Lina Kushner, doing business as the Metropolitan Mechanical Display Company, New York, N. Y.

Application February 16, 1945, Serial No. 578,205

9 Claims. (Cl. 40—104)

This invention relates to display devices and has for its general object and purpose to provide an advertising display device embodying hinged or pivoted members simulating book leaves with simple and reliably operating means for successively turning said members in one direction to display advertising matter on the opposite sides thereof and then simultaneously turning said members in the opposite direction.

One of the principal objects of the present invention is to provide a single cam member of novel construction to coact with complementary elements carried by the hinged or pivoted leaf simulating members and means for actuating said cam whereby the individual and unitary turning movements are imparted to said members.

Another object of the invention is to provide a novel mounting for the leaf members so that in the successive turning movement thereof the gravity movement of each member independently of the operating cam will automatically position the finger or element on the succeeding leaf member for effective engagement by the cam.

It is an additional object of the invention to provide a single operating cam for the leaf members yieldingly urged in one direction to coact with depending fingers on the respective members together with motor actuated means for imparting rotary oscillating motion to said cam.

A further object resides in the provision of a display device as above characterized embodying a minimum number of parts of rugged and durable structural form which may be readily assembled in cooperative relation whereby an appreciable economy in production costs is realized.

With the above and other subordinate objects in view, the invention comprises the improved display device and the construction and relative arrangement of its several parts, as will hereinafter be more fully described, illustrated in the accompanying drawings and subsequently incorporated in the subjoined claims.

In the drawings, wherein I have shown one simple and practical embodiment of the invention and in which similar reference characters indicate corresponding parts throughout the several views:

Figure 5 is a vertical sectional view illustrating the means for yieldably urging the motor actuated cam into coacting engagement with the leaf turning fingers.

Figure 6 is a fragmentary view on an enlarged scale, similar to Figure 1, showing a number of the leaf simulating members after they have been turned, and Figure 7 is a similar view showing the cam at an intermediate position of its reverse rotation in the act of returning all of the leaf simulating members to original position.

Figure 1:
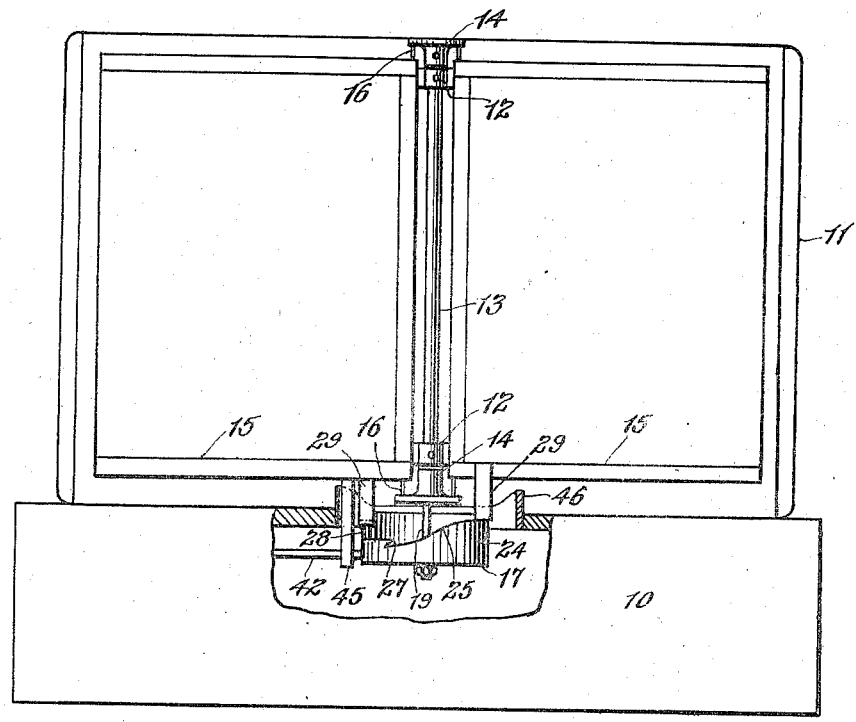
Figure 1 is a front elevation of a book-form display device illustrating a preferred form of the invention, the base being partly broken away.

Referring in greater detail to the drawings, for purposes of illustration I have shown a hollow base 10 upon which the vertical panel 11 is rigidly fixed in any suitable manner. To the front side of this panel, at the approximate center thereof and adjacent to its upper and lower edges bracket members 12 are secured in which a tubular shaft 13 is rotatably journalled.

Upon the upper and lower ends of the shaft 13 flanged collars 14 are suitably fixed, the flanges thereof having the requisite number of spaced apertures to receive the hinge pintles or pivot studs 16 projecting from the upper and lower ends of the card receiving frames 15 at their inner vertical edges. These frames are of well known construction to removably receive cards upon which advertising matter is printed. Any desired number of the frames 15 may be provided and the two outer frames are mounted between the collar flanges at substantially diametrically opposite points. These frame members remain on opposite sides of the shaft 13 in contact with the panel 11 while the remaining intermediate frame members are turned from one side of said shaft to the other by the mechanism which will now be described.

Within the base 10 and below the shaft 13 a cam member 17 is positioned for vertical bodily movement. In the present instance this member is in the form of a cylindrical drum open at its top and having a bottom wall 18 to which the lower threaded end of a rod 19 is centrally fixed by means of the nut 20. This rod extends upwardly into the hollow shaft 13 and is attached to the lower end of a coiled spring 21 within said shaft, the upper end of which is connected to the lower end of a short chain 22 attached to the transverse pin 23 extending through the shaft and the upper collar 14. Thus the spring may have limited bodily rotation about its own axis with the rod 19.

The upstanding cylindrical wall 24 of the member 17 is formed with an upper cam edge 25 extending for slightly more than 90° of its circumference. The wall projects above the high end of this cam edge to form a vertical shoulder 26 and at the low end thereof said wall is undercut to provide an overhanging lug or tooth 27. In spaced relation to this lug the drum wall is provided with a second vertical shoulder 28 of somewhat greater depth than the shoulder 26.

To the lower end of each of the intermediate frame members 15 and adjacent its pivoted edge, in substantial alignment with the wall 24 of the cam drum, a depending finger 29, is fixed. These fingers are, preferably, in the form of flat metal plates which successively increase in length in a clockwise direction with respect to the shaft 13. The first and longest of these fingers is formed with an angular flange 30 for a purpose which will be presently explained.

Figure 2:
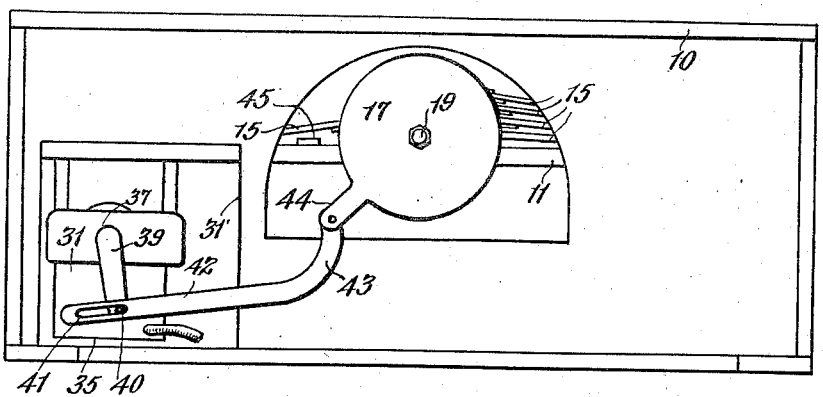
Figure 2 is a bottom plan view.

Any suitable means may be provided for imparting oscillatory motion to the cam member 17 and for this purpose I have shown a fractional horsepower electric motor 31 mounted on the rear side of the panel 11 within an opening 31' in the top wall of the base (Figure 2). The motor shaft is provided with a worm 32 in mesh with the worm gear 33 on shaft 34 journalled in a frame 35 fixed to the motor case. A large gear 36 on shaft 37 mounted in said frame is in mesh with the small gear 38 on shaft 34 so that shaft 37 is rotated at relatively low speed. One end of shaft 37 is provided with a crank arm 39 having a pin 40 engaged in the slot 41 in one end of a lever 42. The other end of this lever is curved as at 43 and pivotally connected to an arm 44 projecting radially from the bottom wall of the cam drum 17. Rotation of the drum in a counterclockwise direction is limited by contact of the arm 44 with a fixed stop 45 secured to the panel 11.

Preferably, a sheet metal guard 46 for the fingers 29 is secured to the top wall of the base 10 at the front side of the opening therein.

From the above description of my improved display device the operation thereof will be understood as follows: Assuming that the intermediate card holding frames 15 lie in superposed relation at the right hand side of the shaft 13 in Figure 1 of the drawings, the cam drum 17 is constantly urged upwardly by the contractile force of the spring 21 to yieldingly hold the upper edge of its vertical wall 24 in contact with the flange 30 of the longest finger 29. When the motor 31 is energized, in the rotation of the cam drum in a counter-clockwise direction, the shoulder 26 on wall 24 is moved rearwardly of the flange 30. The spring 21 now pulls the drum 17 upwardly so that the lower end of the finger is engaged on the cam edge 25. The depth of the shoulder 26 is somewhat less than the difference in length between adjacent fingers 29 and when the arm 44 strikes the stop 45 at the end of the counterclockwise rotation of the drum the upper end of said shoulder is above the lower end and rearwardly of the second finger 29 owing to the downward inclination of the cam edge 25. However, in the reverse or clockwise rotation of the drum the longer finger 29 bearing on the cam edge 25 forces the drum 17 downwardly against the resistance of the spring 21 so that the shoulder 26 escapes the underlying shorter finger and engages the end of the front finger. The card holding frame to which the latter finger is attached is then swung outwardly from the pivots 16 as the cam drum continues to rotate in the clockwise direction until it moves to a position at the left of its pivotal axis after which it descends by gravity to a position substantially parallel with the panel 11 on the left hand side of the shaft 13. The first of the turnable card holding frames 15 is shown in this position in Figure 1 of the drawings with the lug or flange 30 projecting rearwardly from the finger 29. In this latter gravity movement of the frame a partial rotation is imparted to the shaft 13 as the frame pivots move from the right to the left hand side of said shaft so that the pivoted edges of the other right hand frames are moved inwardly toward the shaft. This positions the finger 29 of the next frame relative to the vertical wall of the cam drum for effective engagement by the shoulder 26.

The above described operation is repeated until all of the leaf or card carrying frames provided with the fingers 29 have been turned and are positioned at the left of the shaft 13. After the last or shortest finger releases contact with the shoulder 26 the spring 21 then further pulls the cam drum 17 upwardly until the flange or lug 30 of the longest finger is engaged upon the edge of the drum wall at the lower end of the shoulder 28. At the end of the clockwise rotation of the drum the tooth 27 thereof is positioned behind or rearwardly of the flange 30. Therefore in the following counter-clockwise rotation of the drum said tooth will engage over the edge of the flange 30 and the several superposed card holding frames 15 are simultaneously swung over to their former position at the right hand side of the shaft 13 to be successively turned in the oscillatory operation of the cam drum in the manner above described.

Figures 3, 4:
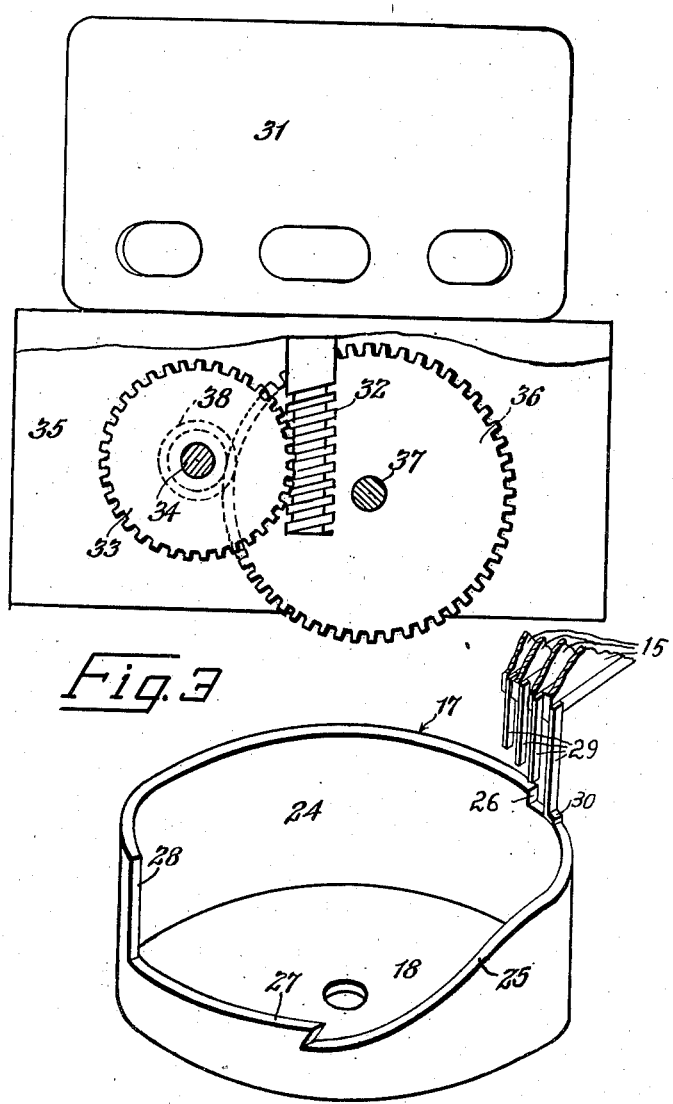
Figure 3 is a detail plan view on an enlarged scale of the motor driven gearing for the cam actuating means.
Figure 4 is a detail perspective view of the leaf turning cam.

It will be seen from the foregoing that I have devised a novel display device which is essentially characterized by the provision of a single oscillatory cam member provided with means for first successively turning the individual book leaf simulating members in one direction and then simultaneously turning all of said members in the opposite direction. Of course, the ratio of the gearing shown in Figure 3 is so determined that ample time is afforded for the reading of advertising matter on the leaf cards at opposite sides of the shaft 13, after each leaf is turned. Any desired number of the card holding frames may be provided and the oscillating cam member may be of other structural forms than that which I have above specifically described. It will further be understood that the arrangement of the spring 21 and its connection with the cam member as herein disclosed is merely suggestive and various other equivalent means may be employed for yieldably maintaining contact between the cam and the fingers on the card holding frames.

The herein described construction, which I have selected as illustrative of my invention, embodies a minimum number of parts of simple design and low production cost and has given highly satisfactory service in practical use. However, since it is evident, as above noted, that the essential features of novelty of my present discloure may also be incorporated in other mechanical embodiments thereof, I reserve the privilege of adopting such modifications in the construction and relative arrangement of the several cooperating elements as may fairly be comprehended within the spirit and scope of the appended claims.

I claim:

1. In a display device, a plurality of book leaf simulating members, a single rotatably supported actuating cam for said members, means individually mounting said members at their inner edges in parallel relation to the cam axis for pivotal movement and for bodily movement relative to each other from one to the other side of the axis of said cam, a cam engaging part on each of said members, and additional means for imparting relative bodily movement between said members and cam axially of the latter to position said parts relative to the cam and cause said cam by rotary movement thereof to effectively engage said parts in succession and singly turn said members from one side of the cam axis to the other.

2. The display device defined in claim 1 wherein said members are mounted above the cam and said cam engaging parts comprise fingers carried by the respective members and depending for relatively different distances therefrom toward the cam.

3. The display device defined in claim 1 wherein said cam is provided with an actuating shoulder common to all of said cam engaging parts, together with means for oscillatably rotating said cam to successively engage the shoulder with said parts in oscillations of said cam in the same direction.

4. The display device defined in claim 1 wherein the last named means comprises a spring yieldingly urging said cam axially in one direction into position for effective engagement with said cam engaging parts.

5. The display device defined in claim 1 wherein said cam has a circumferentially extending cam edge to engage each of said parts and a shoulder at each end thereof, together with means for oscillatably rotating said cam to engage one of said shoulders with one of said parts in successive oscillations of the cam in the same direction to singly turn said members and position the same at one side of the cam axis, and to engage the other of said shoulders with one of said parts in an oscillating motion of the cam in the opposite direction to simultaneously reversely turn said members and position the same at the other side of the cam axis.

6. In a display device, a plurality of pivotally mounted book leaf simulating members, a single cam member below the pivoted ends of said members having a cylindrical wall, fingers on said members depending therefrom for relatively different distances in alignment with said wall of the cam member, said wall having an upper cam edge adapted to contact the lower ends of said fingers and a shoulder at one end thereof to contact one side of each of said fingers, means yieldingly urging the cam member axially upward into coacting engagement with said fingers, and motor actuated means connected with said cam member to oscillatably rotate the same and cause said shoulder, in successive oscillatory movements of said member in the same direction, to successively engage said fingers and singly turn said leaf simulating members from one to the other side of their respective pivots.

7. The display device defined in claim 6 in which said cam wall is provided with additional means adapted to engage the longest depending finger in an oscillating motion of the cam in the opposite direction and simultaneously return all of said members to their original position.

8. The display device defined in claim 6 wherein said pivoted leaf simulating members are mounted on a tubular support and said means for axially urging the cam member is enclosed within said support.

9. The display device defined in claim 6, together with a tubular member mounted in coaxial relation with the cam member, said means for axially urging the cam comprising a coiled spring within said tubular member, and a rod fixed to the cam and attached to one end of said spring.

ADOLPH C. ERISMAN.

REFERENCES CITED

The following references are of record in the file of this patent:

UNITED STATES PATENTS

| Number | Name | Date |
| --- | --- | --- |
| 1,970,215 | Barnett | Aug. 14, 1934 |